United States Patent
Verma et al.

(10) Patent No.: US 12,032,942 B2
(45) Date of Patent: Jul. 9, 2024

(54) TARGETED RELEASE UPDATES FOR CLOUD SERVICE DEPLOYMENTS

(71) Applicant: Microsoft Technology Licensing, LLC, Redmond, WA (US)

(72) Inventors: Nidhi Verma, Bellevue, WA (US); Sandhya Shahdeo, Redmond, WA (US); Rahul Nigam, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 17/899,847

(22) Filed: Aug. 31, 2022

(65) Prior Publication Data

US 2024/0069886 A1    Feb. 29, 2024

(51) Int. Cl.
*G06F 8/65* (2018.01)

(52) U.S. Cl.
CPC ...................................... *G06F 8/65* (2013.01)

(58) Field of Classification Search
None
See application file for complete search history.

(56) References Cited

U.S. PATENT DOCUMENTS

| | | | | |
|---|---|---|---|---|
| 10,146,524 | B1 * | 12/2018 | Killmon | G06F 8/65 |
| 2006/0080656 | A1 * | 4/2006 | Cain | G06F 8/65 |
| | | | | 434/118 |
| 2010/0281456 | A1 * | 11/2010 | Eizenman | G06F 8/61 |
| | | | | 717/172 |
| 2017/0185395 | A1 * | 6/2017 | Arians | G06F 8/71 |
| 2017/0364345 | A1 | 12/2017 | Fontoura et al. | |
| 2018/0091624 | A1 * | 3/2018 | Forbes | H04L 45/74 |
| 2021/0176210 | A1 | 6/2021 | Chan | |
| 2022/0156059 | A1 | 5/2022 | Schumaker | |
| 2023/0353644 | A1 * | 11/2023 | Tscheinig | G06F 8/60 |

OTHER PUBLICATIONS

"FedRAMP", Retrieved from: https://en.wikipedia.org/wiki/FedRAMP, Jun. 22, 2022, 3 Pages.
"Talk:Responsibility assignment matrix", Retrieved from: https://en.wikipedia.org/wiki/Talk%3AResponsibility_assignment_matrix#OARP, Aug. 1, 2022, 7 Pages.
(Continued)

*Primary Examiner* — Qing Chen
(74) *Attorney, Agent, or Firm* — NovoTechIP International PLLC

(57) ABSTRACT

A data processing system implements scalable, secure, and reliable targeted release (TR) deployments of updates in cloud-based service. The TR deployment framework is provided that solves the technical problem of facilitating deployment of updates to targeted release customers. TR customers are associated with pre-deployment requirements (PDRs) associated with accreditation and/or validation tasks that must be completed before the update may be deployed to the customer base of the TR customers. A subset of the TR customer base is provided with segregated access to complete these accreditation tasks and/or validation tasks before the update is provided to the remainder of the userbase of the TR customer. This approach ensures that the industry standards and/or customer requirements are met before the update is deployed to the entire userbase of the TR customer.

20 Claims, 15 Drawing Sheets

(56) References Cited

OTHER PUBLICATIONS

Baumgartner, et al., "Set up the Standard or Targeted release options", Retrieved from: https://docs.microsoft.com/en-us/microsoft-365/admin/manage/release-options-in-office-365?view=o365-worldwide, Apr. 28, 2022, 5 Pages.

"International Search Report and Written Opinion Issued in PCT Application No. PCT/US23/027698", dated Oct. 18, 2023, 14 Pages.

* cited by examiner

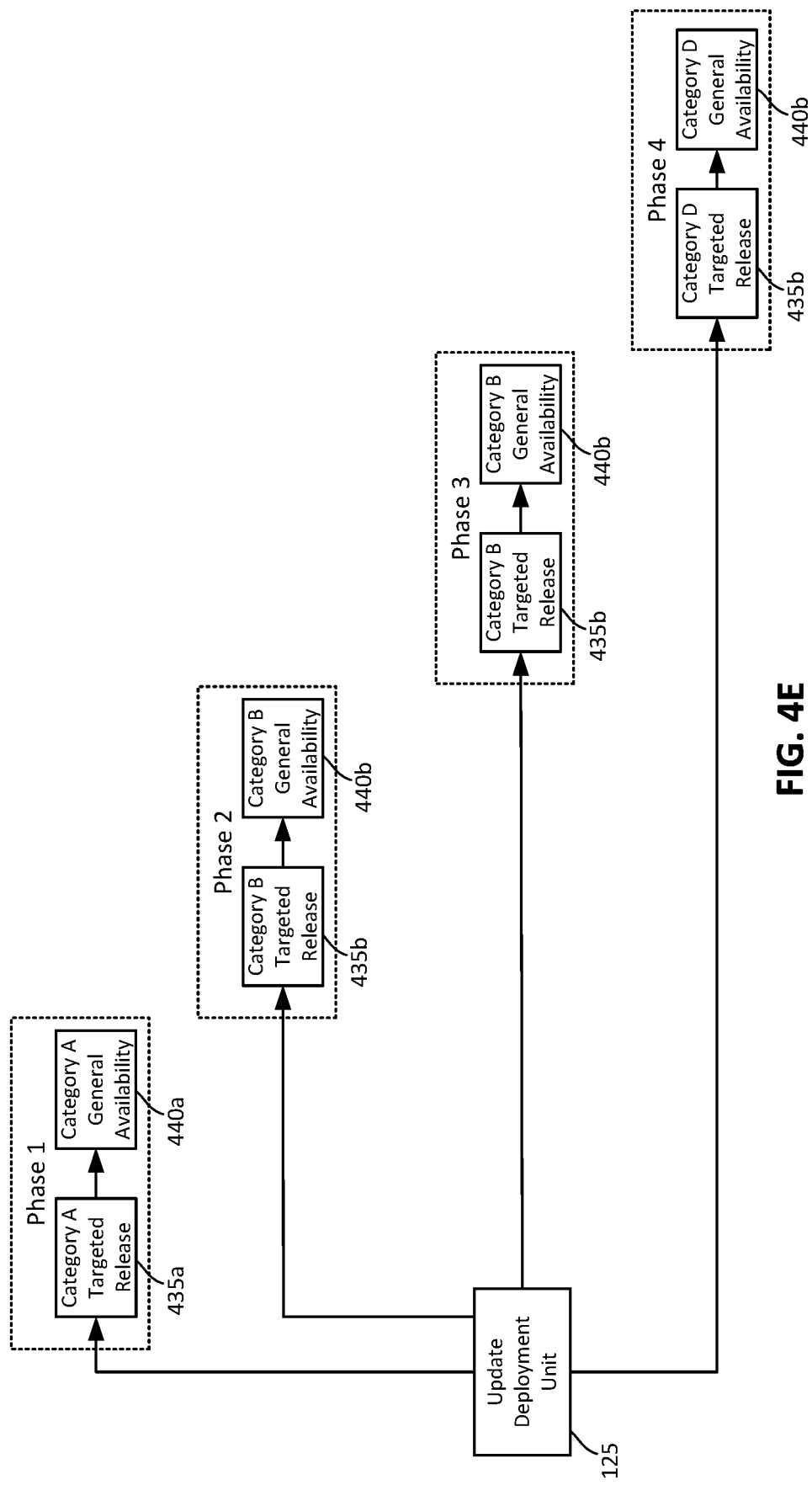

Update Approval Checklist

Update Description: [Deployment A] —— 562

Action Items to be Completed: Please complete the following action items before your users have access to the update. Once all action items are completed, the Approve Update button will be activated.

| | Pending | Completed | Date and Time of Completion |
|---|---|---|---|
| (1) Action Item A | ☐ | ■ | 08/10/2022 14:15 |
| (2) Action Item B | ■ | ☐ | MM/DD/YYYY HH:MM |
| (3) Action Item C | ■ | ☐ | MM/DD/YYYY HH:MM |
| (4) Action Item D | ■ | ☐ | MM/DD/YYYY HH:MM |

564

[ Close ]   [ Approve Update ]

TARGETED RELEASE UPDATES FOR CLOUD SERVICE DEPLOYMENTS

BACKGROUND

Cloud-based services provide computing services over the Internet or a dedicated network. The cloud-based services may provide computing resources, analytics, storage, and network resources to customers. These services may include, but are not limited to applications for creating, consuming, and/or modifying content, file storage and management platforms, collaboration and communications platforms, and other types of software as a service. The architecture of a typical cloud-based service includes numerous servers, network devices, and storage elements to support the services provided. These devices include software, data, and configuration files that need to be periodically updated to add new features, to roll out fixes to software and/or configuration. Furthermore, some services may support software installed on the client devices, and this software may also need to be updated to a newer version to support added features and/or to fix problems associated with a current version of the software.

Updates are typically rolled out in multiple stages to different groups of users to mitigate the risk of deploying the new version of the software and/or configuration data. This approach is referred to as ring deployment. The deployment process is represented by an expanding series of rings, where each ring includes deploying the update to a larger subset of the userbase being provided access to the update. The underlying hardware and software that support the subset of the userbase associated with the ring is updated. Some rings may be further subdivided into "waves" that each include a separate subset of the userbase of that ring. In some implementations, the userbase associated with one or more customers may be associated with each wave. User feedback and telemetry data may be collected from users associated with each ring to determine whether the new version of the software is operating correctly before deploying the updates to the next ring. This process may continue until the updates are deployed across the entire userbase.

Certain customers may have compliance assessment, feature validation, documentation requirements, and/or other such pre-deployment requirements that must be completed prior to an update being permitted to be rolled out to the userbase of that customer. Current ring deployment techniques do not provide a means for these customers to complete such pre-deployment tasks. Consequently, such customers cannot be included in the automated deployment of updates and deploying updates to the userbase of such customers becomes a manual and labor-intensive process that includes ensures the pre-deployment requirements are completed prior to installing the updates for the userbase of these customers. Hence, there is a need for improved systems and methods for deploying updates to customers of a cloud-based service that have pre-deployment requirements that must be completed prior to the deploying the update to the userbase of those customers.

SUMMARY

An example data processing system according to the disclosure may include a processor and a machine-readable medium storing executable instructions. The instructions when executed cause the processor to perform operations including determining a first category of targeted release customers associated with a current stage of a deployment plan for deploying an update to customers of a cloud-based service; providing a first indication to each customer of a set of first customers associated with the first category that an update is available for users associated with the customer; deploying the update to a first subset of users associated with each customer of the set of first customers; receiving a second indication from each customer of the set of first customers that a set of first pre-deployment requirements (PDRs) associated with each customer have been completed for the update; and deploying the update to a second subset of the users associated with each customer of the first category responsive to receiving the second indications, the second subset of the users associated with each customer comprising a remainder of the users associated with the customer not included in the first subset of users.

An example method implemented in a data processing system for deploying updates to a cloud-based service includes determining a first category of targeted release customers associated with a current stage of a deployment plan for deploying an update to customers of a cloud-based service; providing a first indication to each customer of a set of first customers associated with the first category that an update is available for users associated with the customer; deploying the update to a first subset of users associated with each customer of the set of first customers; receiving a second indication from each customer of the set of first customers that a set of first pre-deployment requirements (PDRs) associated with each customer have been completed for the update; and deploying the update to a second subset of the users associated with each customer of the first category responsive to receiving the second indications, the second subset of the users associated with each customer comprising a remainder of the users associated with the customer not included in the first subset of users.

An example machine-readable medium on which are stored instructions. The instructions when executed cause a processor of a programmable device to perform operations of determining a first category of targeted release customers associated with a current stage of a deployment plan for deploying an update to customers of a cloud-based service; providing a first indication to each customer of a set of first customers associated with the first category that an update is available for users associated with the customer; deploying the update to a first subset of users associated with each customer of the set of first customers; receiving a second indication from each customer of the set of first customers that a set of first pre-deployment requirements (PDRs) associated with each customer have been completed for the update; and deploying the update to a second subset of the users associated with each customer of the first category responsive to receiving the second indications, the second subset of the users associated with each customer comprising a remainder of the users associated with the customer not included in the first subset of users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4C, 4D, and 4E are diagrams showing example deployment sequences in which an update is deployed to categories of targeted release customers.

FIG. 5D is a diagram of an example update approval checklist user interface generated by the deployment configuration interface unit of the cloud-based service shown in FIG. 1.

DETAILED DESCRIPTION

Figure 1:
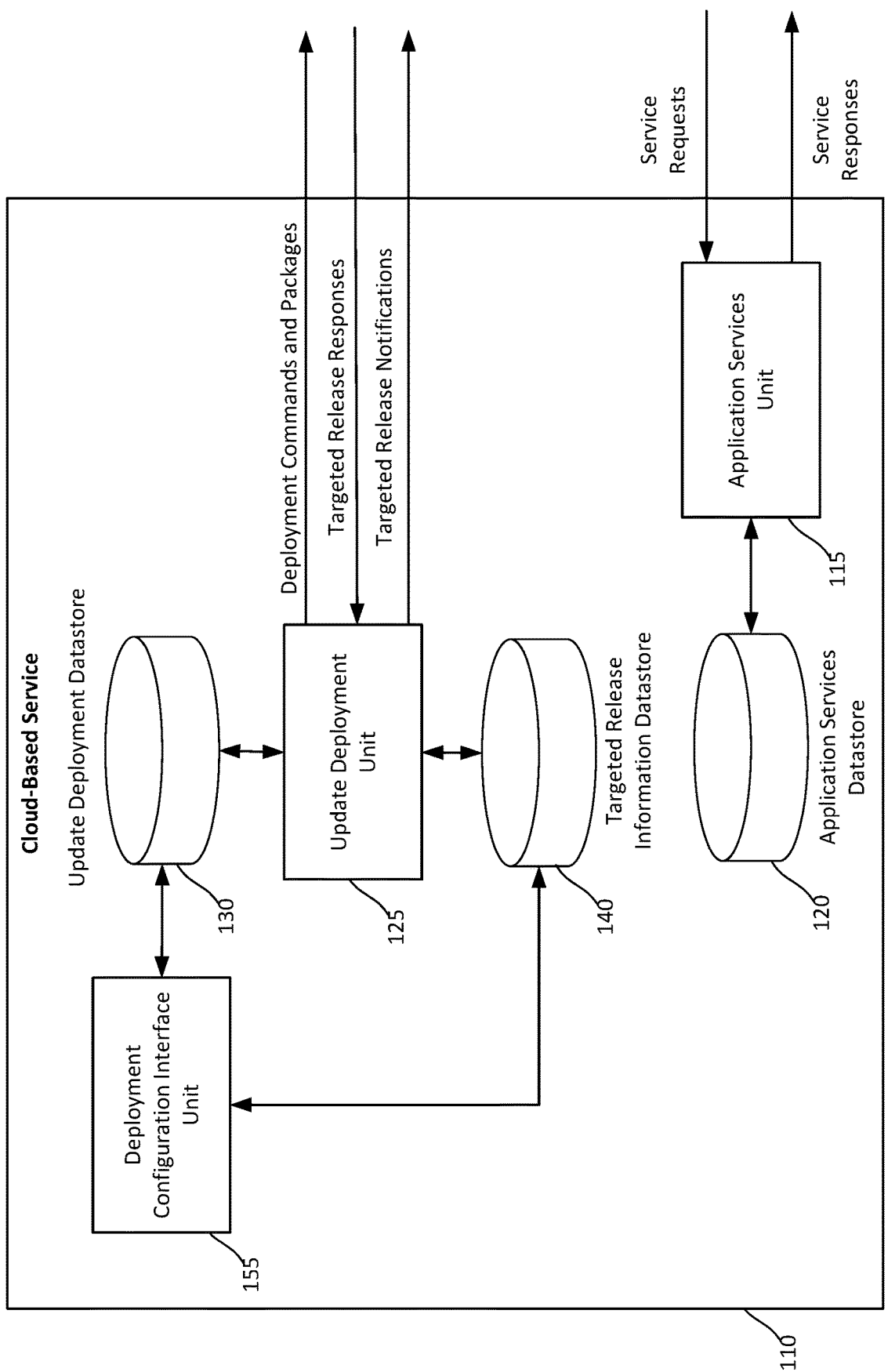
FIG. 1 is a diagram showing an example cloud-based service in which the techniques herein may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for scalable, secure, and reliable targeted release (TR) deployments of updates in cloud-based services for customers associated with pre-deployment requirements (PDRs) are provided. Current TR techniques enable customers to opt in to receive updates before the updates are deployed to all other customers. However, the current TR deployment techniques are inflexible. All the TR customers are associated with a single deployment ring. Furthermore, current TR deployment techniques do not account for the needs for certain customers to complete certain PDRs before the updates are released to the entire userbase of those customers.

The techniques herein provide a flexible and scalable TR deployment framework for customers having PDRs associated with accreditation tasks and/or validation tasks that must be completed before the update may be deployed to the userbase of those customers. The PDRs may include but are not limited to compliance assessments, feature validation, data security assessments, documentation requirements, and/or other such pre-deployment tasks to be completed before the update is deployed to the userbase of a customer. The compliance assessments may be imposed by government entities, by regulatory requirements, data protection and privacy laws, and/or other constraints placed on the cloud-based services provided to targeted release customers. Furthermore, the validation assessments may be imposed by customer requirements and/or industry standards associated with the TR customers.

The TR deployment framework solves the technical problem of facilitating deployment of updates to targeted release customers in a cloud-based computing environment that includes both targeted release customers and non-TR customers. A subset of the TR customer base is provided with segregated access to complete these accreditation tasks and/or validation tasks before the update is provided to the remainder of the userbase of the TR customer. This approach ensures that the industry standards and/or customer requirements are met before the update is deployed to the entire userbase of the TR customer.

The TR deployment framework implements a flexible deployment plan that can accommodate the needs of both TR and non-TR customers. In contrast with current TR deployment techniques where all TR customers are associated with the same ring of a ring-based deployment plan, the techniques herein permit TR customers to be associated with different rings or waves of the deployment plan. Some TR customers may be associated with a TR-specific ring or wave of the deployment plan. In other implementations, the TR customers may be associated multiple rings or waves of the deployment plan that only include TR customers. In yet other implementations, TR customers may be associated with a ring or wave of the deployment plan that includes both TR customers and non-TR customers. Furthermore, the sequence in which the updates are deployed to the TR customers is customizable so that certain TR customers receive and validate the update before the updates are deployed to other such TR customers.

A technical benefit of the deployment framework is that updates are deployed in a consistent, secure, and reliable manner across the cloud-based service including both targeted release and non-TR customers. Another technical benefit of the deployment framework is a significantly improved user experience for users of the cloud-based service by ensuring that updates improve the functionality and stability of the cloud-based service. A TR customer has an opportunity to test the update and/or perform other PDRs before the update is deployed across the entire userbase of that TR customer. This approach provides assurances that the update will not negatively impact the user experience of the users of the TR customers. These and other technical benefits of the techniques disclosed herein will be evident from the discussion of the example implementations that follow.

FIG. 1 is a diagram showing an example cloud-based service 110 in which the techniques for targeted-release of updates in the cloud-based service 110 provided herein may be implemented. The cloud-based service 110 includes an application services unit 115 and an application services datastore 120. The cloud-based service 110 also includes an update deployment unit 125, an update deployment datastore 130, a deployment configuration interface unit 155, and a targeted release information datastore 140.

The application services unit 115 may be configured to provide the various services offered to users of the cloud-based service 110. The application services unit 115 may be configured to receive service requests from the client devices of users and to provide service responses to the client devices of the users. The specific types of services provided by the cloud-based service 110 may vary. These services may include, but are not limited to, providing applications for creating, consuming, and/or modifying content, file storage and management platforms, collaboration and communications platforms, and other types of software as a service. The application services unit 115 stores data associated with the various services provide in the application services datastore 120.

Figure 4A:
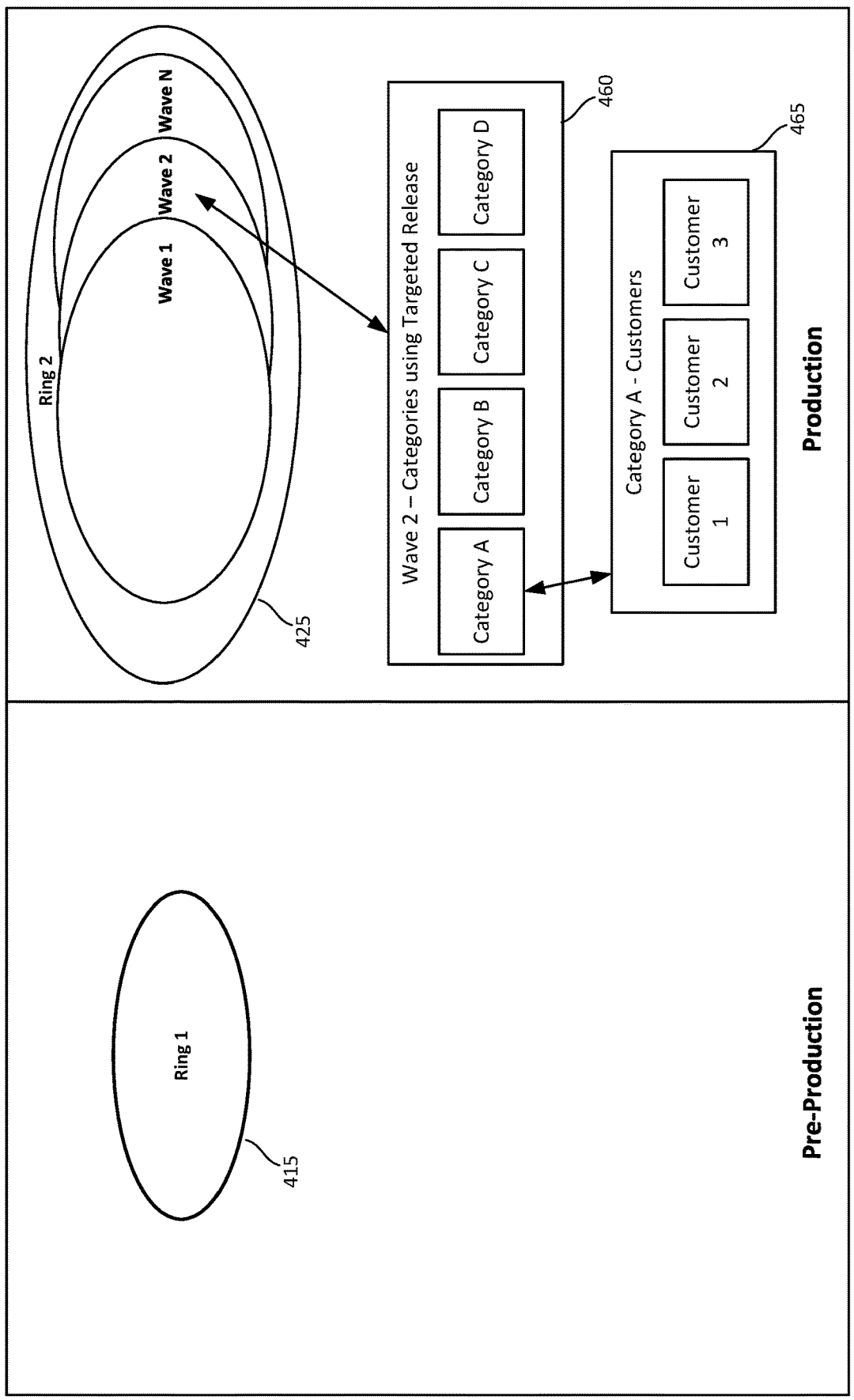
FIG. 4A is a diagram showing a representation of a ring configuration for deploying updates on a cloud-based architecture, such as that of the cloud-based service shown in FIG. 1.

The update deployment unit 125 facilitates deployment of updates according to the deployment configuration information provided by a user via the user interface provided by the deployment configuration interface unit 155. The update deployment unit 125 provides software and/or configuration data associated with the update to various components of the cloud-based service 110. In some implementations, the deployment of the software and/or configuration data is performed using a ring deployment approach in which the deployment process is represented by an expanding set of rings in which each ring includes deploying the updates to a larger subset of the userbase being provided access to the update. An example of such a ring deployment is shown in FIG. 4A and is discussed in detail in the examples which follow. The update deployment unit 125 is configured to send deployment commands and/or packages of software and/or configuration data to various components of the cloud-based service 110.

The update deployment unit 125 supports the flexible targeted release techniques provided herein. The TR customers are not limited to a single ring or wave of the deployment plan and may be associated with a ring or wave of the deployment plan that is also associated with non-TR customers. Furthermore, the update deployment unit 125 supports sequencing of the deployment of the updates to the TR customers in multiple phases so that certain TR customers may receive the updates and perform the associated PDRs before the updates are deploy to the TR customers associated with subsequent phases of the deployment plan.

Targeted release customers have PDRs to be completed before an update may be deployed to the customer base of the targeted release customer. The PDRs include but are not limited to compliance assessments, feature validation, data security assessments, documentation requirements, and/or other such pre-deployment tasks. In some implementations, targeted release customers are grouped into targeted release categories. Each of the customers associated with a particular category utilize the same set of PDRs for testing the update to determine whether the update may be deployed to their respective userbases. Furthermore, the update deployment unit 125 is configured to deploy updates to the TR customers according to a user defined sequence in some implementations. Examples of such sequences are shown in FIGS. 4C-4E and will be discussed in detail in the examples which follow.

The update deployment unit 125 sends targeted release notifications to each targeted release customer that an update is available and ready for testing by the customer. In some implementations, the update deployment unit 125 deploys an update to a set of TR test users associated with the TR customer. The targeted release test users are tasked with ensuring that the PDRs associated with that customer are completed. The targeted release test users provide targeted release responses in response to the targeted release notifications. The targeted release response from a particular customer may include but are not limited to an indication that the PDRs associated with that customer have been completed and the update is approved for deployment to the remainder of the userbase of the customer, an indication that the update is being tested, or an indication that one or more of the PDRs could not be completed for the build so that build cannot be deployed to remainder of the userbase of the customer. A technical benefit this deployment framework is a significantly improved user experience for users of the cloud-based service by ensuring that updates improve the functionality and stability of the cloud-based service and provides assurances that the update will not negatively impact the user experience of the users of the TR customers. Another technical benefit is that this approach ensures that the compliance issues, regulatory requirements, data protection and privacy requirements, and/or other constraints placed on the targeted release customers are met prior to deploying the update to the entire userbase of the customer thereby reducing the likelihood that the update would need to be backed out and a previous version of the software and/or data restored. Consequently, this approach can reduce computing, network, and storage resources required to deploy the update to the customers of the cloud-based computing environment.

The deployment configuration interface unit 155 provides user interfaces for configuring and monitoring the status of deployments of updates. Examples of these user interface include but are not limited to the deployment configuration manager user interface 505, shown in FIG. 5A, the targeted release configuration user interface 550, shown in FIG. 5B, the deployment status user interface 565, shown in FIG. 5C, and the update approval checklist user interface 560, shown in FIG. 5D. The deployment configuration interface unit 155 is configured to enable an authorized user to configure various parameters of the deployment of an update, to configure target release of updates to targeted release customers, and to monitor the status of the deployment of the update to both target release customers and other customers of the cloud-based service 110.

The update deployment datastore 130 is a persistent datastore for storing information associated with the configuration of and execution of deployments. The targeted release information datastore 140 is a persistent datastore for storing information associated with the targeted release customers. The user interfaces generated by the deployment configuration interface unit 155 are part of a web application or web applications provided by the cloud-based service 110 in some implementations, and the web application or applications may be accessed by using a web browser or web-enabled application on a client device an administrator of the cloud-based service 110 or an authorized user of a customer of the cloud-based service 110. In some implementations, the user interfaces shown in 5A, 5B, and 5C are generated by a native application on the client device of the administrator of the cloud-based service instead of or in addition to the deployment configuration interface unit 155 providing these users interfaces. In some implementations, the user interface shown in 5D is generated by a native application the client device of the authorized user associated with a customer of the cloud-based service 110.

Figure 2:
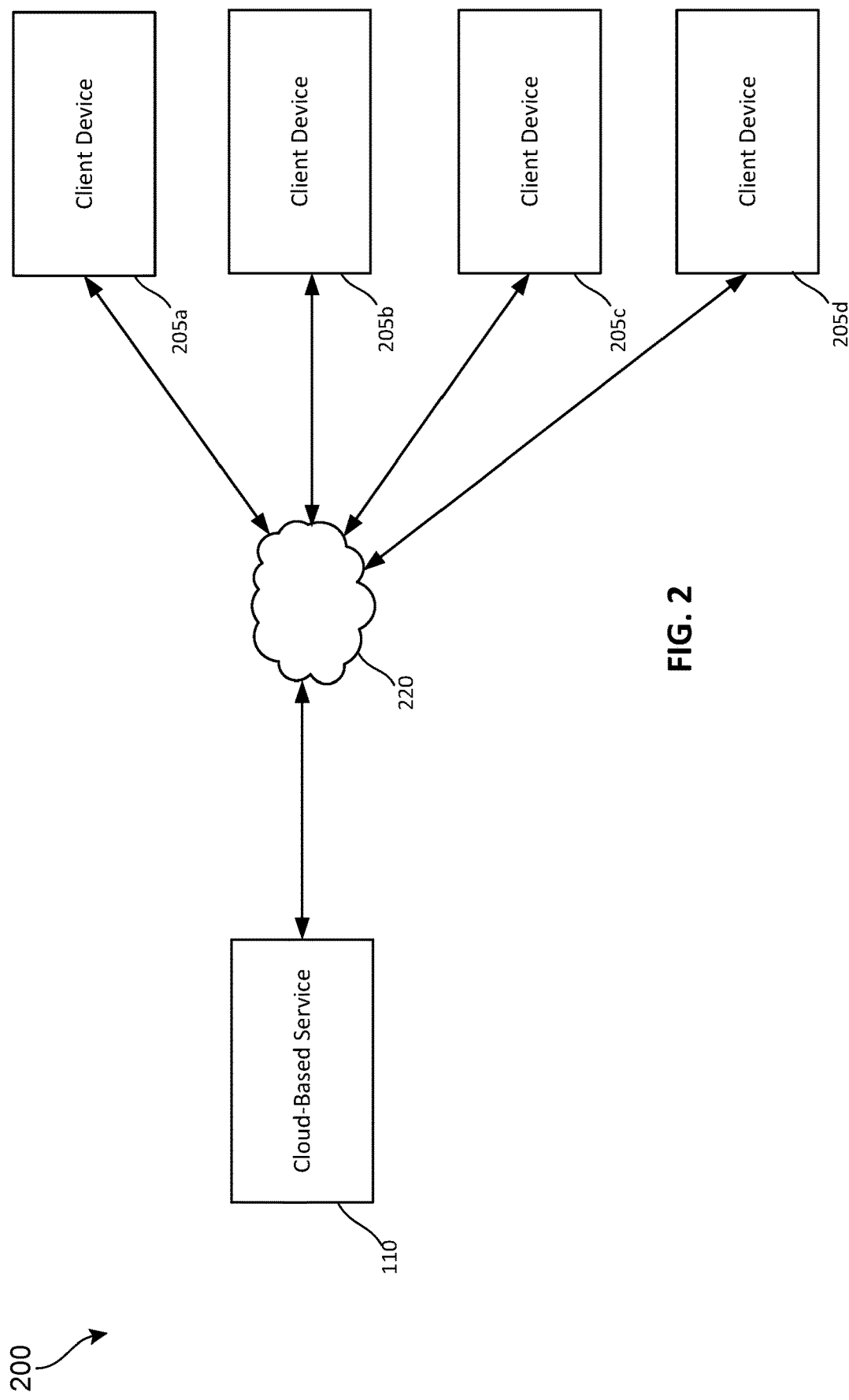
FIG. 2 is a diagram showing an example computing environment in which the cloud-based service shown in FIG. 1 may be implemented.

FIG. 2 is a diagram showing an example computing environment 200 in which the cloud-based service shown in FIG. 1 may be implemented. The computing environment 200 may include the cloud-based service 110 that implements the techniques for monitoring and controlling the deployment of updates in cloud-based services for improved reliability of the cloud-based services described herein. The example computing environment 200 may also include one or more client devices, such as the client devices 205*a*, 205*b*, 205*c*, and 205*d* (collectively referred to as client device 205). The client devices 205*a*, 205*b*, 205*c*, and 205*d* may communicate with the cloud-based service 110 via the network 220 to utilize the services provided by the cloud-based service 110. The client devices may be used by administrators of the cloud-based service 110 to configure and monitor the performance of the cloud-based service 110 and/or by customers of the cloud-based service 110 to access the services provided by the cloud-based services 110. The network 220 may be a dedicated private network and/or the combination of public and private networks commonly referred to as the Internet.

In the example shown in FIG. 2, the cloud-based service 110 is implemented as a cloud-based service or set of services. These services may include, but are not limited to, applications for creating, consuming, and/or modifying content, file storage and management platforms, collaboration and communications platforms, and other types of software as a service. The cloud-based service 110 may include numerous servers, network devices, storage elements and other components to support the various services that are provided by the cloud-based service 110. For example, the cloud-based service 110 may include one or more collections of computer servers, referred to as a server farm, that are configured to provide computational and/or storage resources for at least a portion of the services provided by the cloud-based service 110. The server farm may be configured to provide fail-over protection so that if a computer server within the server farm experiences a failure, the tasks assigned to that server are handed off to another computer server within the farm. The server farm may also be configured to such that one or more machines may be taken offline temporarily to facilitate updates to the software and/or configuration data of the servers. Other architectures are also possible, and the deployment configuration information for deploying an update to the cloud-based service 110 accounts for the specific architecture and configuration of the components thereof. Furthermore, the cloud-based service 110 may also include other hardware and software to support various processes and services that support and maintain the components of the cloud-based service 110.

In some implementations, the update deployment management functionality described as being implemented by the cloud-based service 110 may instead be implemented as a separate service (not shown in FIG. 2) that is configured to handle the executing the deployment, monitoring the status of the deployment, and halting the deployment and/or taking remedial actions in response to the occurrence of certain conditions on behalf of the cloud-based service 110 and/or other such services. In such an implementation, the deployment policy and generation and execute functionality may be offered as another cloud-based service.

The client devices 205*a*, 205*b*, 205*c*, and 205*d* are computing devices that may be implemented as a portable electronic device, such as a mobile phone, a tablet computer, a laptop computer, a portable digital assistant device, a portable game console, and/or other such devices. The client device 205 may also be implemented in computing devices having other form factors, such as a desktop computer, vehicle onboard computing system, a kiosk, a point-of-sale system, a video game console, and/or other types of computing devices. While the example implementation illustrated in FIG. 2 includes four client devices, other implementations may include a different number of client devices that may utilize the cloud-based service 110. Furthermore, in some implementations, some features of the services provided by the cloud-based service 110 may be implemented by a native application installed on the client device 205, and the native application may communicate with the cloud-based service 110 over a network connection to exchange data with the cloud-based service 110 and/or to access features implemented on the cloud-based service 110. As discussed above, the client devices may be used by administrators of the cloud-based service 110 to configure and monitor the performance of the cloud-based service 110 and/or by customers of the cloud-based service 110 to access the services provided by the cloud-based services 110.

Figure 3:
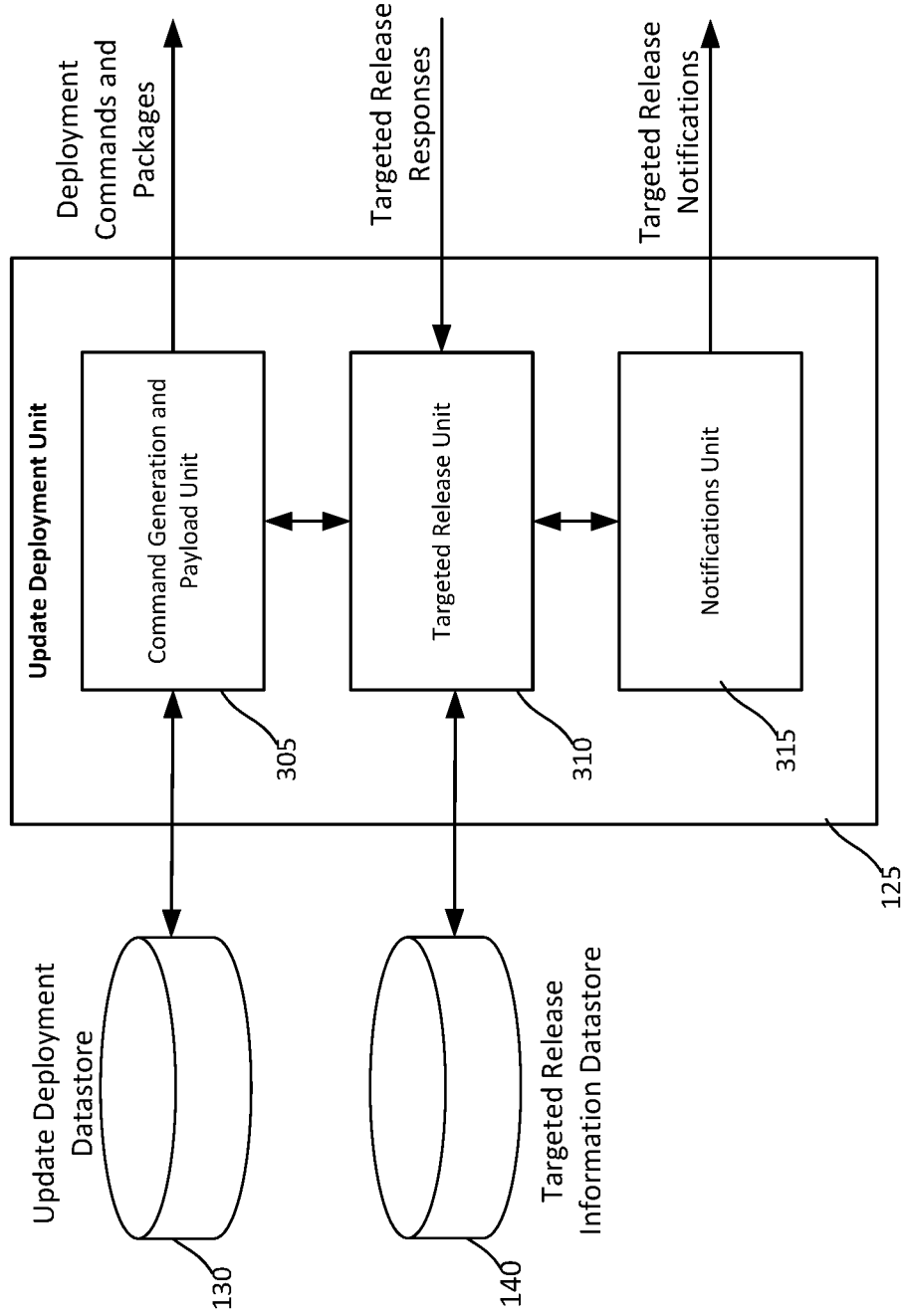
FIG. 3 a diagram showing an example deployment monitoring and control unit of the cloud-based service shown in FIG. 1.

FIG. 3 a diagram showing a non-limiting example implementation of the update deployment unit 125 of the cloud-based service shown in FIG. 1. The update deployment unit 125 includes a command generation and payload unit 305, a targeted release unit 310, and a notifications unit 315. The command generation and payload unit 305 is configured to generate deployment commands and packages to various components of the cloud-based services 110. The command generation and payload unit 305 utilizes deployment information stored in the update deployment datastore 130 to determine the order in which an update is to be deployed to the various components of the cloud-based service 110 and to the various customers of the cloud-based service 110. Each customer is allocated computing and storage resources on the cloud-based service 110, and updates to the software may be deployed to customers in stages. In some implementations, a ring-based deployment approach may be implemented, such as that shown in FIG. 4A, which is discussed in detail in the examples which follow. While the deployment is referred to as an update, these techniques may be used to deploy new software for customers as well deploying updates to software that has already been deployed to those customers.

The targeted release unit 310 coordinates deploying updates to targeted release customers. The targeted release unit 310 determines which customers are TR customers and the sequence in which the updates are to be deployed to the TR customers based on information stored in the targeted release information datastore 140. When an update is ready to be deployed to customers of the cloud-based service 110, the targeted release unit 310 determines whether a customer included in a current ring, wave, or other stage of the deployment is a TR customer and provides an indication to the command generation and payload unit to deploy the update to the set of targeted release test users associated with the TR customer. The remainder of the users associated with the targeted release customer remain on the current version of the software and are not provided access to the update until the PDRs associated with that customer have been completed and the cloud-based service 110 is notified in a targeted release response that the PDRs have been completed. Once a targeted release response that indicates that the PDRs associated with a particular customer have been received, the targeted release unit 310 instructs the command generation and payload unit 305 to deploy the update to the remainder of the userbase of the targeted release customer. This group of users is also referred to herein as the "general audience" for that customer.

In some implementations, the targeted release unit 310 determines whether a category or categories of TR customer are associated with a current ring, wave, or other stage of the deployment plan. As will be discussed greater detail in the examples which follow, the targeted release unit 310 deploys the updates to the TR customers in a predetermined sequence based on the category or categories of TR customers associated with the current ring, wave, or other stage of the deployment plan. An administrator of the cloud-based service may configure the sequence in which the updates are deployed to the TR customers. The sequence in which the updates are deployed to the TR customers may depend at least in part on the sensitivity of the type of customer of each category to updates and potential issued detected in an update. Some TR customers may contract with the provider of the cloud-based service 110 to participate in the target release deployment either earlier or later within the deployment process. Some categories of TR customers receive the updates in earlier phases of the deployment process to provide additional time to perform the accreditation tasks and/or validation tasks included in the PDRs for that category of customer. Other categories of TR customers receive the updates in later phases of the deployment process so that problems with the update may have been detected by other customers who have already received the updates and performed various accreditation tasks and/or validation tasks on the updates. Other factors, such as the size of the userbase of the customer associated with each category of customer may also be used to determine the sequence in which the updates are deployed to each category of customer. For example, categories of customers having a smaller userbase that are less likely to be impacted by issues with the update may be associated with an earlier phase of the deployment than categories of customers having a larger userbase.

The notifications unit 315 generates targeted release notifications which are sent to administrators and/or other contact users associated with a targeted release customer. These users may be identified by the customer and the contact information associated with those users may be added to the targeted release information datastore 140. The targeted release notifications may provide notifications via email, text messages, and/or other means for notifying the administrators and/or other contact users associated with a targeted release customer. The targeted release notifications may include an identifying what has been updated, information identifying the PDRs to be completed before the update may be deployed to the remainder of the userbase of the customer, an indication indicating that the update will be deployed to the remainder of the user in response to an indication from a targeted release response from the customer indicating that the PDRs have been completed, and/or other information associated with the update.

FIG. 4A is a diagram showing a representation of a ring configuration 410 for deploying updates on a cloud-based architecture, such as that of the cloud-based service 110 shown in FIG. 1. Each ring may be associated with a predetermined number of users of the services provided by the cloud-based service 110. The number of users associated with each subsequent ring may be increased until the entire userbase has access to the updates that are being deployed. The number of rings associated with a particular deployment may depend upon the specific update to be deployed, the architecture of the cloud-based service 110, the risk associated with the specific update, and/or other factors.

In some implementations, the update deployment unit 125 receives and analyzes telemetry, log, and alert data associated with the updated software and/or user feedback data indicative of the performance of the updates as the updates are deployed to each ring. The update deployment unit 125 halts further deployment of the updates in response to the telemetry data and/or the user feedback data indicated that the updates are not operating as expected based on the telemetry, log, and alert data. The update deployment unit 125 of the expands the rollout to the next ring in response to the telemetry data and/or user feedback indicating that the updates appear to be operating correctly.

Each ring may include a subset of servers and/or other components onto which the updates are deployed to provide the selected subset of users associated with each ring that are provided the updates. The ring configuration 410 includes two rings 415 and 425. In this non-limiting example configuration, the first ring 415 is associated with users in preproduction environments in which the updates may be tested by users before deploying the updates to a production environment associated with the second ring 425 in which users who are customers of the organization are provided access to the updates. In this example, the first ring 415 is associated with an internal group of users associated with the organization. These users may include members of the development team, testing team, and/or others who have been selected as a first set of users to receive and utilize the update. The client devices 205a, 205b, 205c, and 205d of the users and/or components of the cloud-based service 110 may provide telemetry data. The users themselves may be prompted to provide by the cloud-based service 110 to provide feedback on the update. This telemetry data and/or the user feedback may be analyzed to determine whether the updates are operating as expected. The update deployment unit 125 of the cloud-based service 110 may halt the deployment to the subsequent rings of the ring configuration 410 in response to determining that the updates are not operating as expected. Otherwise, the update deployment unit 125 may continue with the deployment process by deploying the updates to the second ring 425. While the example shown in FIG. 4A includes just two rings, other implementations may include a deployment plan that include additional rings for updates to the preproduction and/or production environments.

In the example shown in FIG. 4A, updates are deployed by the update deployment unit 125 first to users associated with the preproduction environment before rolling out the updates to the users associated with the production environment. In this example, the organization has many employees who are also users of the services provided by the cloud-based service 110. The preproduction environment in this example may be implemented on a separate server and/or sets of servers than the production environment, and the updates may initially be deployed to the server or servers associated with the preproduction environment. In other implementations, the same server or set of servers may provide services to both the preproduction and production environments, and users are directed to the appropriate version of the software based on the group with which the users are associated. Telemetry, log, and alert data may be collected from components of the cloud-based service 110 and user data may be collected from the users associated with the first ring 415, and the deployment monitoring and control unit 125 of the cloud-based service 110 may halt the deployment to the second ring 425 of the ring configuration 410 in response to determining that the updates are not operating as expected. Otherwise, the deployment process may continue with the update deployment unit 125 of the cloud-based service 110 deploying the updates to the second ring 425.

The second ring 425 includes users that are using a production version of the software. Thus, the second ring 425 includes users that are outside of organization and are customers who subscribe to the services provided by the cloud-based service 110. The second ring 425 may include a very large number of users. In this example, the second ring 425 may include millions or even billions of users. Thus, the second ring 425 may be further subdivided into waves, and each wave includes a subset of the users that make up the second ring 425. These waves may be used to gradually roll out the updates out to full userbase and to provide another opportunity to collect and analyze telemetry data, alert data, log data, and/or user feedback from a broader userbase before deploying the updates to all users.

The waves may be selected in various ways. In some implementations, users may be subdivided randomly into several waves to reduce the number of users from the second ring 425 for whom the updates are being deployed at one time. In other implementations, the waves may be based on a priority associated with the user. For example, some users may be provided with early release of new features and updates. In such an implementation, users having a first priority may be associated with the first wave, users having a second priority may be associated with the second wave, and users having a third priority may be associated with the third wave. In this example, only the second ring 425 was subdivided into a set of waves. However, more than one ring may be subdivided in this manner depending upon the size of the userbase, complexity, and risk associated with the deployment. Furthermore, whereas this example shows three rings, other implementations may utilize a different number of rings based on the size of the userbase, complexity, and risk associated with the deployment. The techniques provided can monitor the performance of the update at each of waves and may initiate halt and/or recovery operations in response to the telemetry data, alert data, log data, and/or user feedback received in a similar manner as may be undertaken for each of the rings.

In the example implementation shown in FIG. 4A, several categories of TR customers have been associated with wave 2 of the second ring 425. Other implementations may be associated with additional rings and/or waves that may also be associated with one or more TR customers and/or categories of TR customers. The targeted release customers have been grouped by category. In this example, there are four categories 460: Category A, Category B, Category C, and Category D. The customers associated with each category utilize the same set of PDRs for determining whether the update may be deployed to their respective userbase. Each category is associated with one or more customers. In the example implementation shown in FIG. 4A, Category A is associated with three customers 465. The number and types of categories depends may vary from implementation to implementation based on the types of customers and the PDRs used by each of these customers to determine whether a particular update are operating as expected and can be deployed to entire userbase of that customer. While the targeted release customers are associated with the same wave of the same ring of the deployment in the example implementation shown in FIG. 4A, other implementations may associate the targeted release customers with different rings and/or waves of the deployment plan.

Figure 4B:
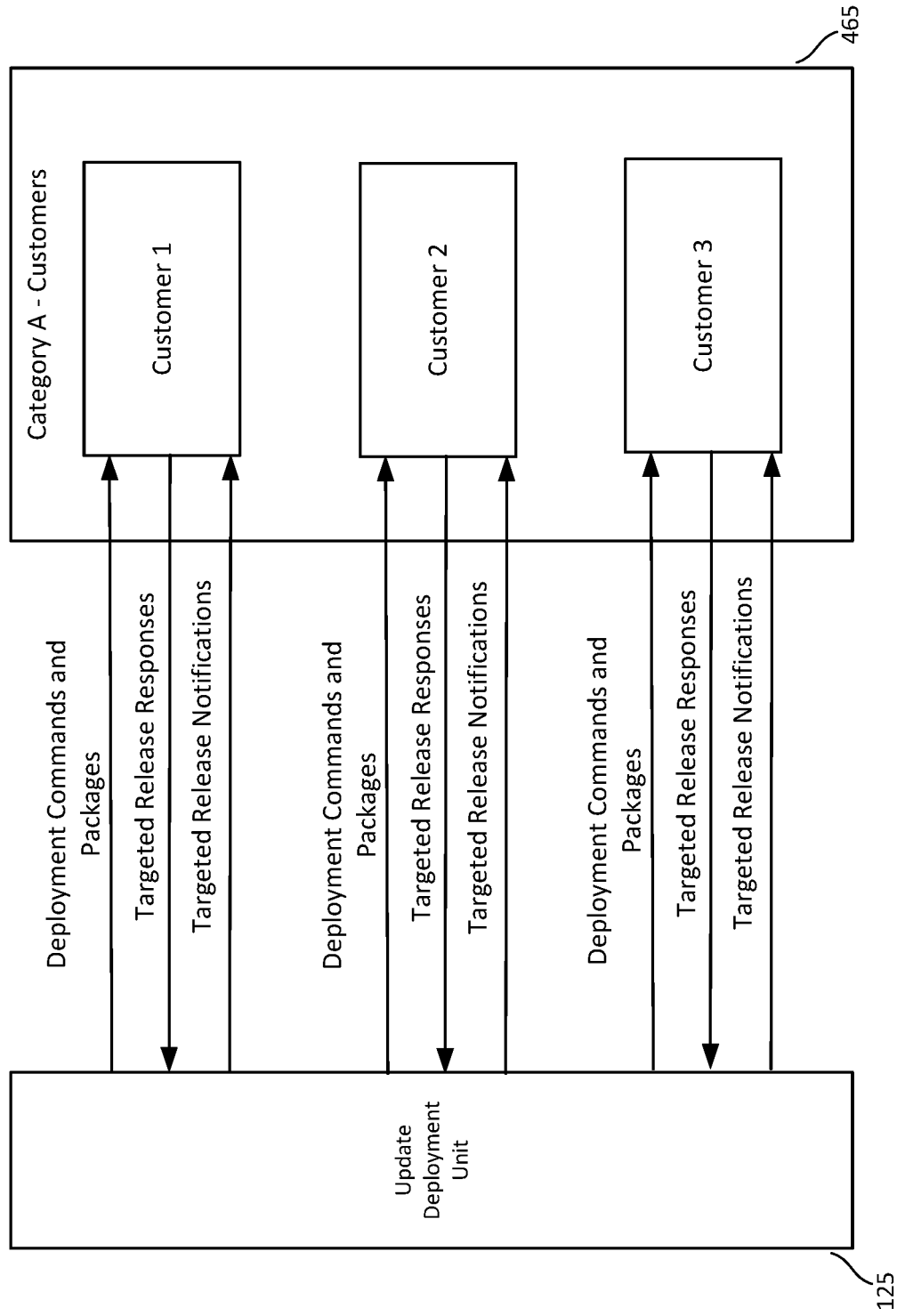
FIG. 4B is a diagram that shows an example of the deployment of an update to the customers associated with a particular category of targeted release customer.
Figure 4C:
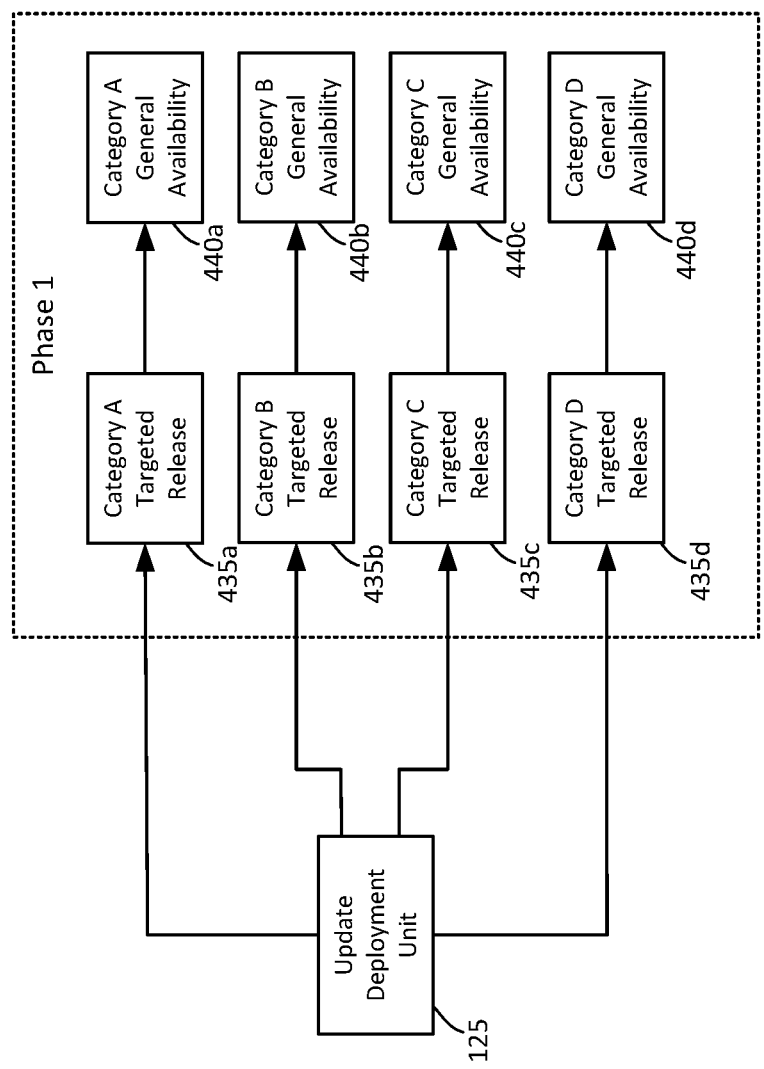
Figure 4D:
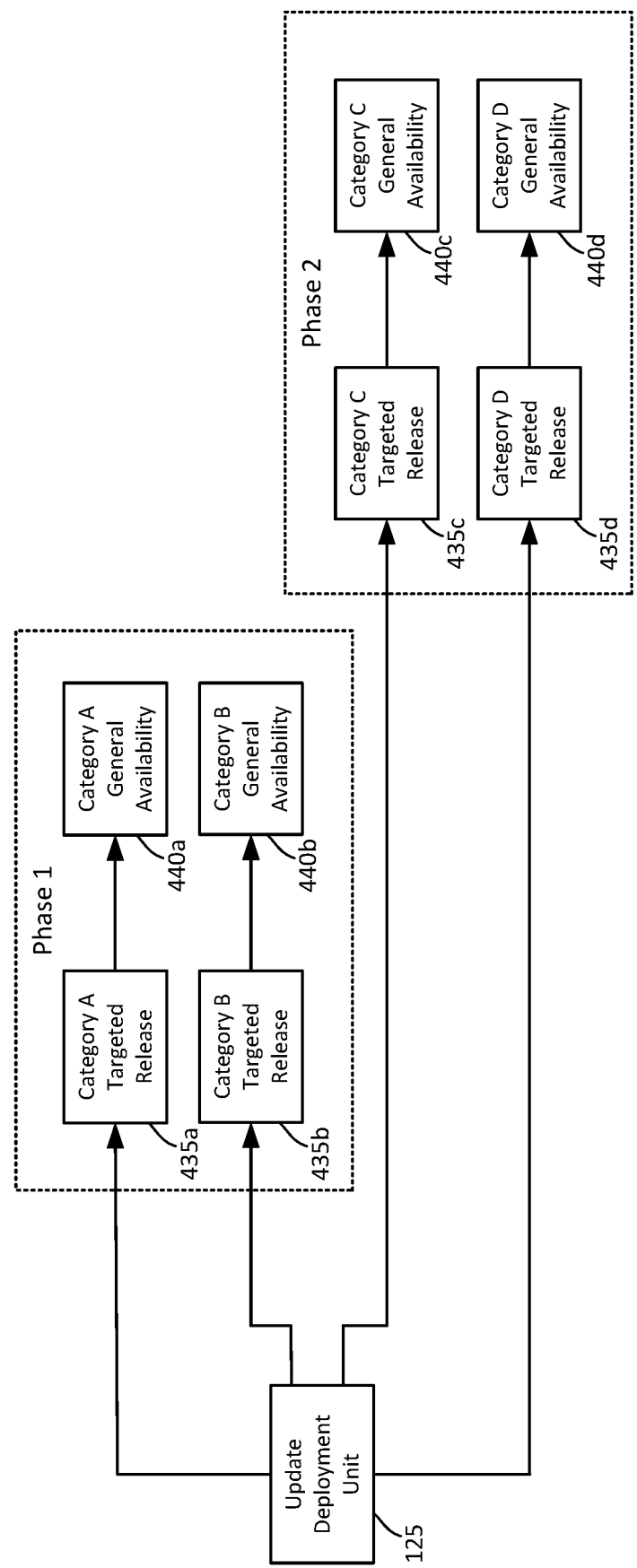

FIG. 4B is a diagram that shows an example of the deployment of an update to the customers associated with a particular category of targeted release customer. The example implementation shown in FIG. 4B shows that each of the customers receives a targeted release notification from the update deployment unit 125 indicating that an update is available and ready the customer to complete the PDRs associated with that category of targeted release customer. In some implementations, the update deployment unit 125 sends the deployment commands and packages to each customer automatically to cause the update to be deployed for the set of targeted release test users associated with that customer. The update is not deployed to the rest of the userbase of the customer until the customer completes the PDRs for that customer. In some implementations, the update is automatically deployed to the set of targeted release test users by the update deployment unit 125, while in other implementations an administrator associated with the customer is notified of the availability of the update by the update deployment unit 125 via a targeted release notification, and the customer provides a targeted release response that includes an indication whether the update deployment unit 125 is permitted to deploy the update to the set of targeted release test users of the customer. In some implementations, the user provides an indication of a date and/or time at which the update may be deployed to the set of targeted release test users. A technical benefit of this approach is that the administrator may specify date and time that the updates may be deployed to the customer during a day and/or time where less of the customer's users are using the cloud-based service and are using less of the computing, memory, and storage resources allocated to that customer.

The update is deployed to each of the targeted release customers separately and each customer is provided the opportunity to test the update prior to authorizing the update to be deployed to their respective userbase. In some implementations, the update deployment unit 125 deploys the update to the userbase of the customer once the customer sends a targeted release notification to the cloud-based service 110 regardless of whether the other customers within that category have approved the update, rejected the updated, or are still in the process of testing the update. If, for example, Customer 1 shown in FIG. 4B does not approve the update, but Customers 2 and 3 do approach the update, the update deployment unit 125 deploys the update to the entire userbases of Customers 2 and 3 but does not deploy the update to the userbase of Customer 1. A technical benefit of this approach is that one customer does not delay or prevent the update from being deployed to the userbase of another customer of the cloud-based services 110.

FIGS. 4C, 4D, and 4E show examples of the sequences that the update deployment unit 125 could use when deploying updates to multiple categories of customers, such as the categories 460 shown in FIG. 4A. FIG. 4C shows an example of in which the updates are deployed to customers in Categories A, B, C, and D in parallel in a single phased deployment approach. The updated deployment unit 125 deploys the update to the targeted release testing users 435*a* associated with Category A, the target release testing users 435*b* associated with Category B, the target release testing users 435*c* associated with Category C, and the target release testing users 435*d* associated with Category D in parallel. The update deployment unit 125 deploys the update to make the update generally available to the full userbase 440*a* of Category A in response to the target release testing users 435a indicating that the PDRs associated with Customer A have been completed. The update deployment unit 125 deploys the update to make the update generally available to the full userbase 440b of Category B in response to the target release testing users 435b indicating that the PDRs associated with Customer B have been completed. The update deployment unit 125 deploys the update to make the update generally available to the full userbase 440c of Category C in response to the target release testing users 435c indicating that the PDRs associated with Customer C have been completed. The update deployment unit 125 deploys the update to make the update generally available to the full userbase 440d of Category D in response to the target release testing users 435d indicating that the PDRs associated with Customer D have been completed.

FIGS. 4D and 4E shows example implementations in which the update deployment unit 125 is configured to deploy updates to the targeted release clients in multiple phases based on the category associated with the targeted release clients. FIG. 4D shows an example implementation in which the update deployment unit 125 deploys the updates to Categories A and B in phase 1 and categories C and D in phase 2 of the deployment plan. FIG. 4E shows an example in which the update deployment unit 125 deploys the update to the customers associated with each category in a separate phase. Such multi-phase approaches may be implemented where certain categories of targeted release customers are prioritized for receiving releases earlier than others. In some implementations, certain targeted release customers contract with the provider of the cloud-based service 110 to receive updates earlier than other customers in exchange for providing feedback on these updates. In other implementations, certain targeted release customers pay for early access to the updates. In yet other implementations, the order of the deployment of the update to the categories of the targeted release customers is based on other factors, such as the number of customers associated with each category, the size of the userbase of each of the clients associated with each category, the level of risk associated with the update, and other such factors. In some implementations, each phase of the deployment plan is completed before the update deployment unit 125 continues with the next phase of deployment. A phase is complete once the update has been made generally available to the userbase of each of the customers associated with that category of targeted release customers included in that phase. In other implementation, a phase is complete once all the customers associated with that phase have had their userbases updated or the customer has rejected the update because one or more PDRs associated with that customer could not be completed. In a non-limiting example, the update fails compliance testing and is rejected by the customer. Other implementations may have different PDRs and one or more of these PDRs may not be able to be completed for various reasons specific to that implementation. In yet other implementations, the update deployment unit 125 may be configured to move from phase to phase after an amount of a predetermined amount of time specified in the deployment plan information for the deployment. Different phases may be associated with different amount of time. In such implementations, the phases may overlap at least in part, as one or more preceding phases may not have completed before the update deployment unit 125 moves on to the next phase. The incomplete preceding phases continue to be executed in parallel with the newly initiated phases of the deployment plan.

Figure 5A:
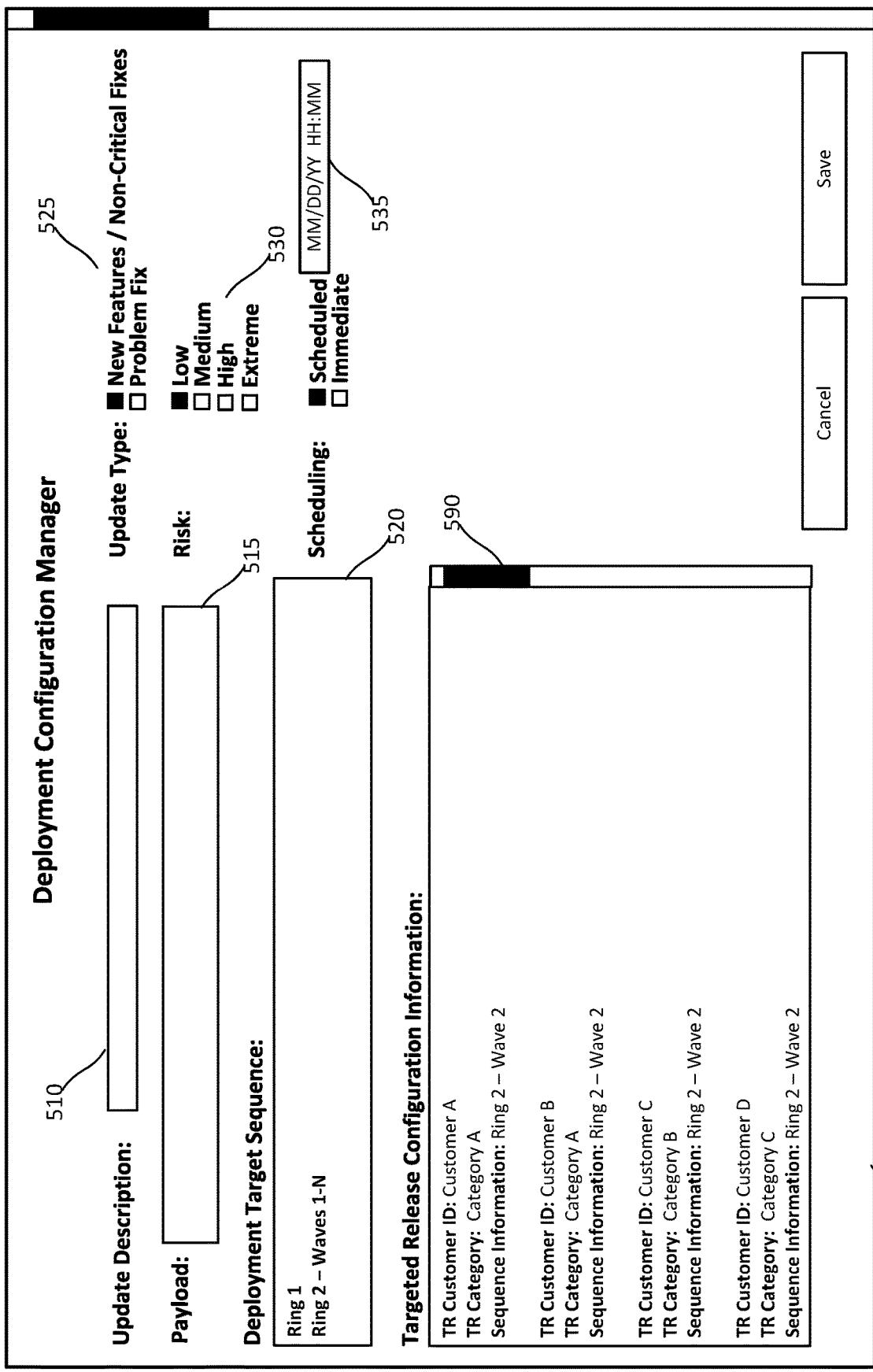
FIG. 5A is a diagram of an example deployment configuration manager user interface generated by the deployment configuration interface unit of the cloud-based service shown in FIG. 1.

FIG. 5A is a diagram of an example of a deployment configuration manager user interface 505 which may be generated by the deployment configuration interface unit 155 of the cloud-based service shown in FIG. 1. The user interface 505 enables a user to set up a new deployment of an update and/or modify the parameters of an existing update. The deployment configuration information entered or modified using the user interface 505 is stored in the update deployment datastore 130.

The user interface 505 includes a description field 510 in which the user may enter a description of the update. The payload field 515 provides a means for the user to specify the software and/or configuration files to be deployed with the update. The payload field 515 may associated each payload item with a target component of the cloud-based service 110 on which the payload item is to be deployed. The deployment target sequence pane 520 may specify an order in which the deployment process should proceed when deploying the update to the components of the cloud-based service 110. In the example shown in FIG. 5A, the target sequence specifies an order of the rings to which the update is to be deployed. In other implementations, a separate user interface may be provided to permit a user to define a ring deployment plan that specifies an order in which updates are to be deployed to components of the cloud-based service 110.

The user interface 505 also includes update type radio buttons 525 that allow the user to select whether the update is associated with a new feature or non-critical fixes or is associated with a problem fix that is more critical. The user interface 505 also includes risk radio buttons that allow the user to define how risky a particular update may be relative to other updates. A lower risk update is less likely to impact the user experience of the userbase or is likely to impact a small number of users. A higher risk update is likely to impact a large percentage of the userbase and may impact critical features of the services provided by the cloud-based service 110. The user interface 505 includes scheduling radio buttons 535 that allow the user to select whether the update is to be deployed immediately or scheduled for deployment at a future date and time.

The targeted release configuration information pane 590 provides information for each of the targeted release customers associated with the deployment. In the example shown in FIG. 5A, the targeted release configuration information includes a targeted release customer identifier, a targeted release category, and sequence information associated with each of the customers. The customer identifier is a unique identifier that is assigned to each customer. The targeted release category is a category of targeted release customer associated with the customer. The sequence information represents the ring and/or wave in which the target release for the customer is to be implemented. In some implementations, the sequence information may include additional information that indicates a phase of a multiphase targeted release deployment in which the target release for the customer is scheduled.

Figure 5B:
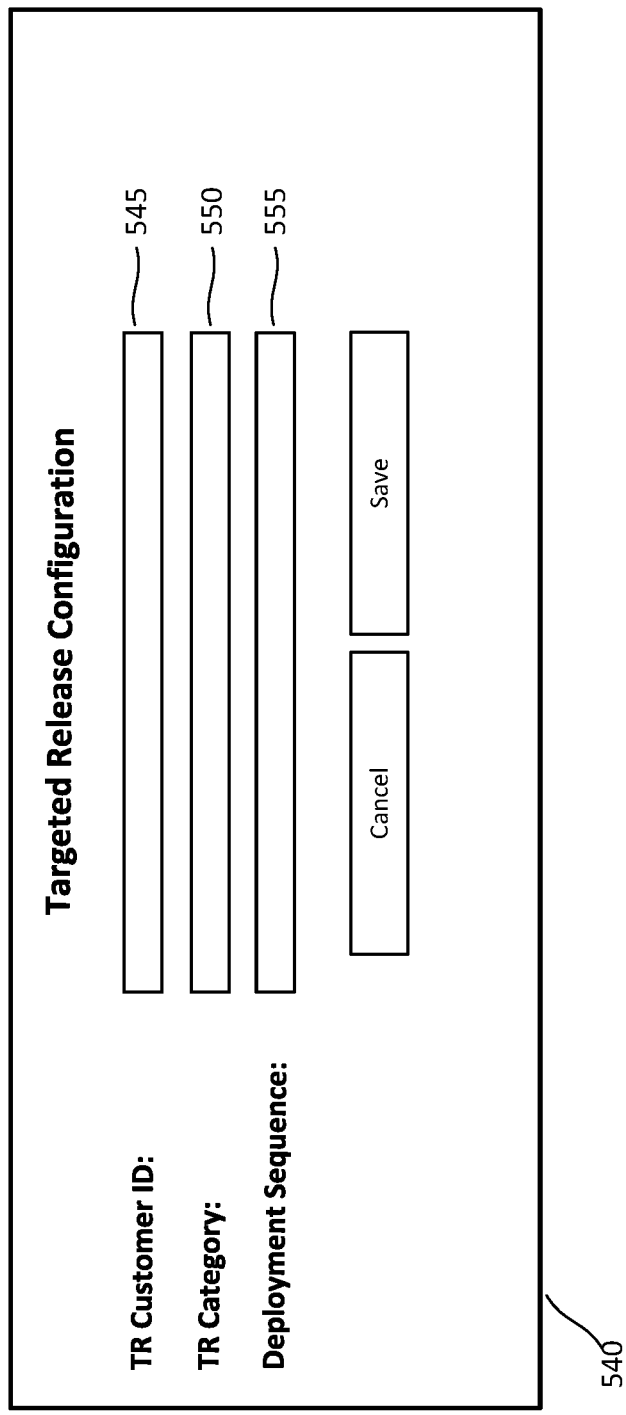
FIG. 5B is a diagram of an example targeted release configuration user interface generated by the deployment configuration interface unit of the cloud-based service shown in FIG. 1.

FIG. 5B shows a targeted release configuration user interface 540 that permits the customer data for a new customer to be entered or customer data for an existing customer to be modified. The user interface 540 includes a customer identifier field 545, a targeted release category field 550, and a deployment sequence field 555. The customer identifier field 545 is used to enter the unique identifier for the customer, the category field 550 is used to associate a targeted release category with the customer, and the deployment sequence field 555 is used to enter sequence information that identifies the ring, wave, and/or phase information indicating the point in the deployment schedule when the targeted deployment will be implemented for the customer.

Figure 5C:
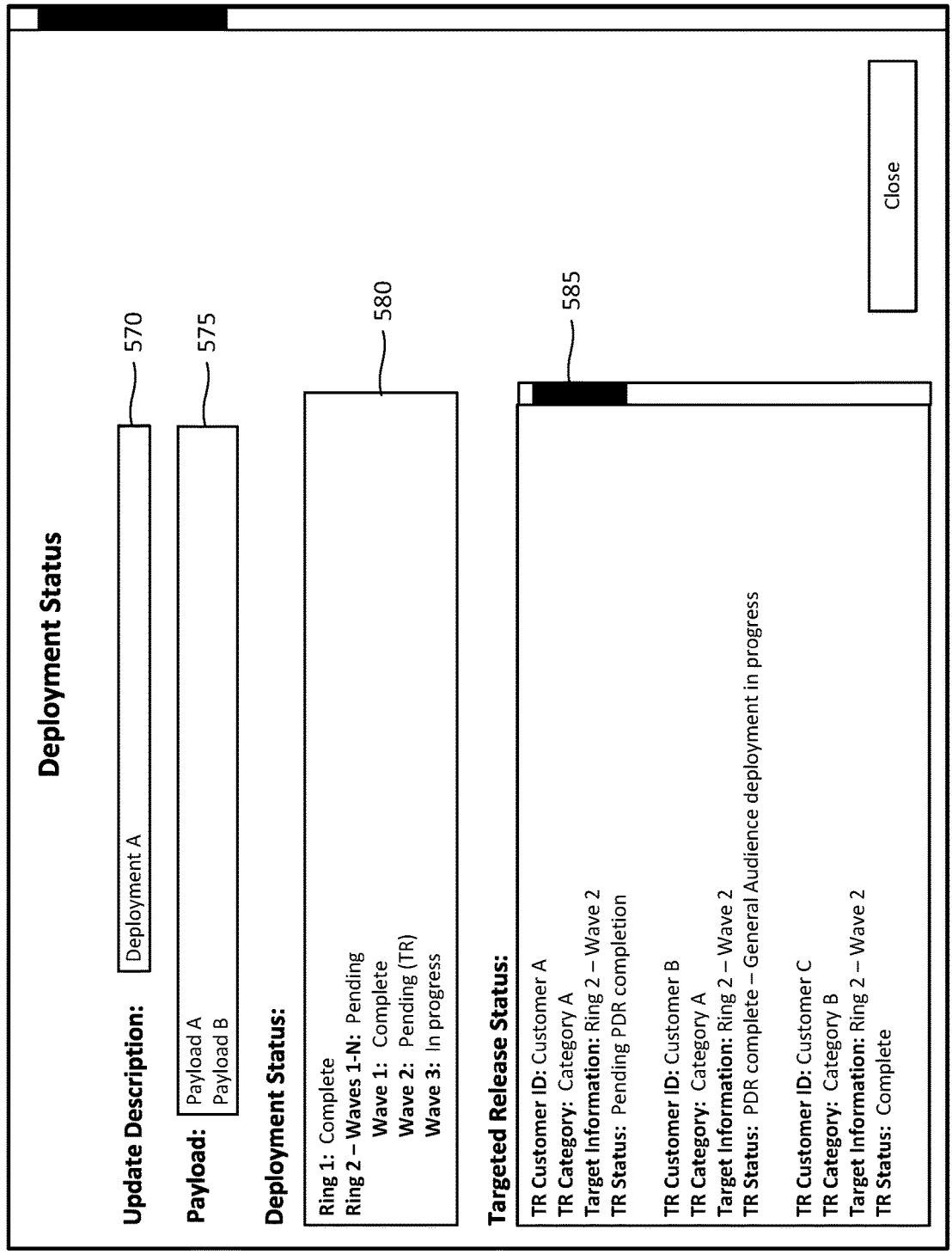
FIG. 5C is a diagram of an example deployment status user interface generated by the deployment configuration interface unit of the cloud-based service shown in FIG. 1.

FIG. 5C shows a deployment status user interface 565. The deployment status user interface 565 includes an update description field 570, a payload field 575, a deployment status pane 580, and a targeted release status pane 585. The deployment status user interface 565 may be accessed by an administrator or other authorized user to check the status of the update being deployed to the cloud-based service 110. The deployment status user interface 565 provides information that can be used to track the progress of the deployment of the update including the status of deployments to targeted release customers.

The update description field 570 shows the description of the update that was entered in the update description field 510 of the deployment configuration manager user interface 505. The payload field 575 show the payload indicating what is being deployed in the update that was entered in the payload field 515 of the deployment configuration manager user interface 505. The deployment status pane 580 shows the progress of the deployment according to the deployment target sequence entered in the deployment target sequence pane 520 of the deployment configuration manager user interface 505. The deployment status pane 580 includes information that indicates whether each ring, wave, and/or phase of the deployment plan has been completed, is in progress, or pending. The deployment status pane 580 includes an indication whether a particular ring, wave, or phase of the deployment plan includes targeted release customers. The targeted release status page 585 includes information indicating the progress of the deployment to the targeted release customers. The targeted release status indicates whether the deployment of the update is complete for the customer, is pending but not yet initiated, pending PDR completion, PDR complete and general audience deployment in progress, and/or other such indications of the state of progress of the deployment of the update to the targeted release customers.

FIG. 5D is a diagram of an example update approval checklist user interface 560 generated by the deployment configuration interface unit of the cloud-based service shown in FIG. 1. The update approval checklist user interface 560 provides an interface for an authorized user of a customer to access a checklist of action items associated with the PDRs to be completed before an update may be deployed to the userbase of the customer. The authorized user may be a targeted release test user or administrator user associated with the customer.

The update description field 562 includes a description of the update to be deployed and displays the description information provided in the update description field shown 510 shown in FIG. 5A. The action items pane 564 shows a list of the action items to be completed that are associated with the PDRs for that customer. As discussed in the preceding examples, customers are grouped into categories, and each category of customer is associated with a set of PDRs that must be completed for that category of customer before an update may be deployed to the userbase of that customer. The action items shown in the action items pane 564 correspond to the PDRs to be completed. In some implementations, the customer may also have one or more customer-specific PDRs that are associated with that customer. The customer-specific PDRs may be provided by the customer at the time that the customer is added to the cloud-based service 110 and stored in the targeted release information datastore 140. The customer-specific PDRs are shown in the action items pane 564 with the category-specific action items.

As each item is completed, the completed checkbox can be checked by the user. In some implementations, the user interface 560 causes the client device 205 to generate a targeted release response and send the targeted release response to the cloud-based service 110 in response to each action item associated with the PDRs being completed. The targeted release response may include an identifier of the PDR associated with the action item and the data and time and completion. The targeted release unit 310 of the update deployment unit 125 receives the targeted release response and updates the targeted release information datastore 140 with this information. In some implementations, the update approval checklist user interface 560 includes an "Approve Update" button that is disabled until each of the action items are completed. The user clicks on or otherwise activates the "Approve Update" button, once enabled, to cause the client device 205 to send a targeted release response to the cloud-based service 110 indicating that the PDRs have been completed and the update may be deployed to the userbase of the customer.

Figure 6:
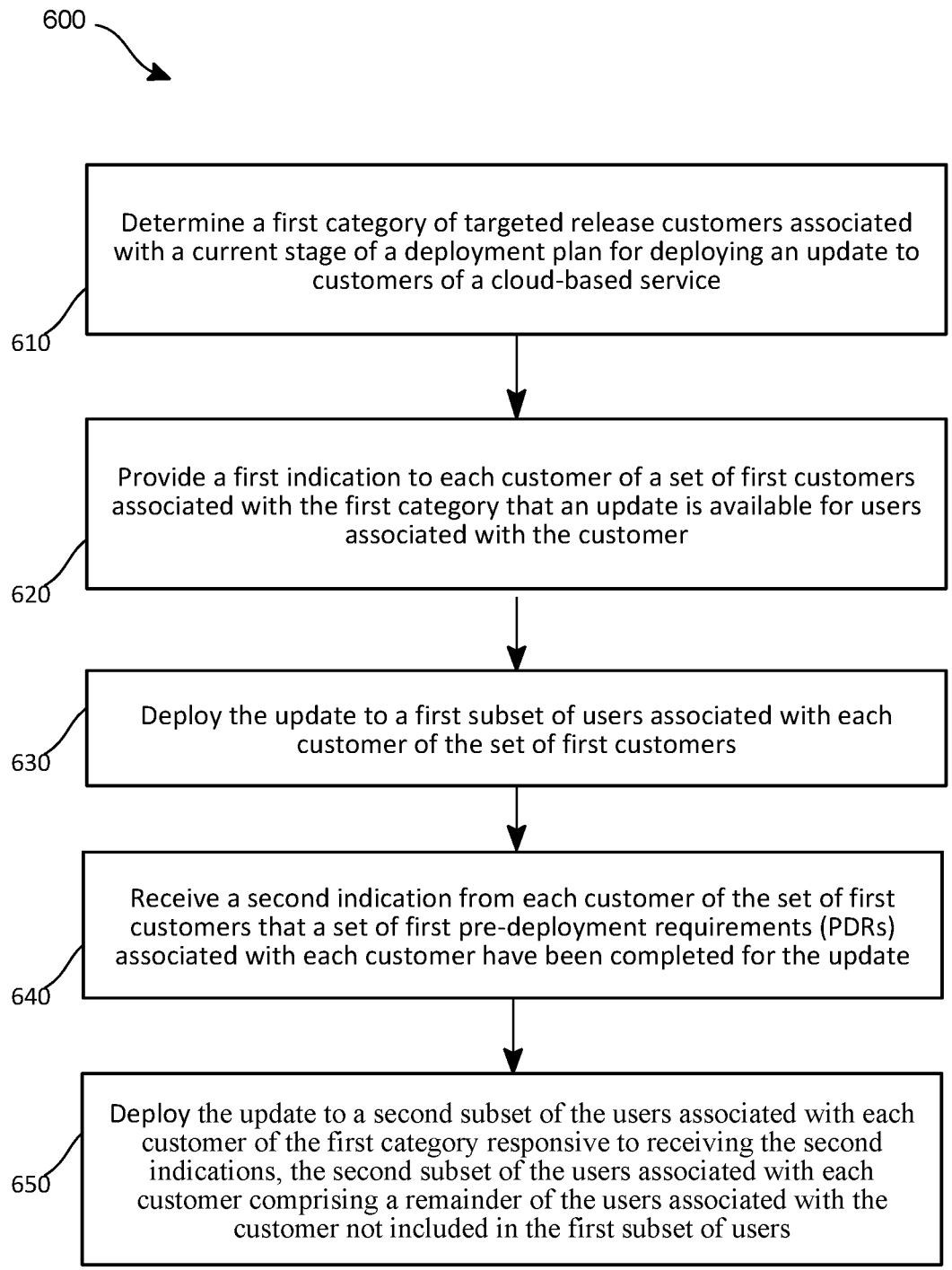
FIG. 6 is a flow diagram of an example process for monitoring and controlling the deployment of an update to a cloud-based service.

FIG. 6 is a flow chart of an example process 600 for managing the deployment of updates to a cloud-based service 110. The process 600 may be implemented by the update deployment unit 125 of the cloud-based service 110. The process 600 may be used to implement targeted release of the update to targeted release customers of a cloud-based service. The update deployment unit 125 may deploy the updates to the cloud-based service 110 using a ring-based deployment plan as discussed in the preceding examples.

The process 600 may include an operation 610 of determining a first category of targeted release customers associated with a current stage of a deployment plan for deploying an update to customers of a cloud-based service. As discussed in the preceding examples, the current stage of the deployment plan may be a ring, wave, or phase. Each ring, wave, or phase of the deployment plan may be associated with one or more categories of customer. Furthermore, each category of customer may be associated with one or more targeted release customers.

The process 600 may include an operation 610 of providing a first indication to each customer of a set of first customers associated with the first category that an update is available for users associated with the customer. As discussed in the preceding examples, the update deployment unit 125 may send a targeted release notification to the targeted release customers indicate that the update is ready for testing by the targeted release test users of the customer. As discussed in the preceding examples, the update deployment unit 125 deploys the update according to a ring deployment plan in some implementations, and the update deployment unit 125 sends the targeted release notifications to customers as the deployment reaches the ring, wave, or phase of the deployment associated with the target release customer. Furthermore, different targeted release customers may be associated with different rings, waves, or phases of the ring deployment plan.

The process 600 includes an operation 620 of deploying the update to a first subset of users associated with each customer of the set of first customers. The update deployment unit 125 deploys the update to the targeted release test users of each customer of the set of first customers. In some implementations, the update deployment unit 125 deploys the update to the targeted release test users automatically when the updated deployment unit 125 reaches the ring, wave, or phase of the deployment plan with which the first customer is associated. In other implementations, the update deployment plan 125 awaits an indication from the first customer that the update can be deployed to the targeted release test users in response to the targeted release notification being send to the first customer.

The process 600 includes an operation 630 of receiving a second indication from each customer of the set of first customers that a set of first pre-deployment requirements (PDRs) associated with each customer have been completed for the update. As discussed in the preceding examples, each targeted release customer is associated with a set of PDRs to be completed before the update may be deployed to the userbase of the customer. The PDRs may include compliance assessment, feature validation, documentation requirements, and/or other such pre-deployment requirements that must be completed prior to an update being permitted to be rolled out to the userbase of that customer. The customer performs testing of the update and/or other tasks associated with the PDRs. Once the PDRs have been completed, the customer send the second indication to the cloud-based service 110 that the PDRs have been completed and the update deployment unit 125 may now deploy the update to the userbase of the customer.

The process 600 includes an operation 640 of deploying the update to a second subset of the users associated with each customer of the first category responsive to receiving the second indications. The second subset of the users associated with each customer include a remainder of the users associated with the customer not included in the first subset of users. The second subset of the users associated with the first customer includes a remainder of the users associated with the customer not included in the first subset of users. The update deployment unit 125 deploys the update to the rest of the userbase of the customer in response to receiving the second indication.

The example process 600 shown in FIG. 6 describes deploying of a targeted release to a single customer of the cloud-based service 110. However, as discussed in the preceding examples, the update deployment unit 125 may deploy updates to multiple targeted release customers. These targeted release customers may be associated with a same category or multiple categories of targeted release customer. Furthermore, the targeted release customers may be associated with different rings, waves, or phases of the deployment.

The detailed examples of systems, devices, and techniques described in connection with FIGS. 1-6 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
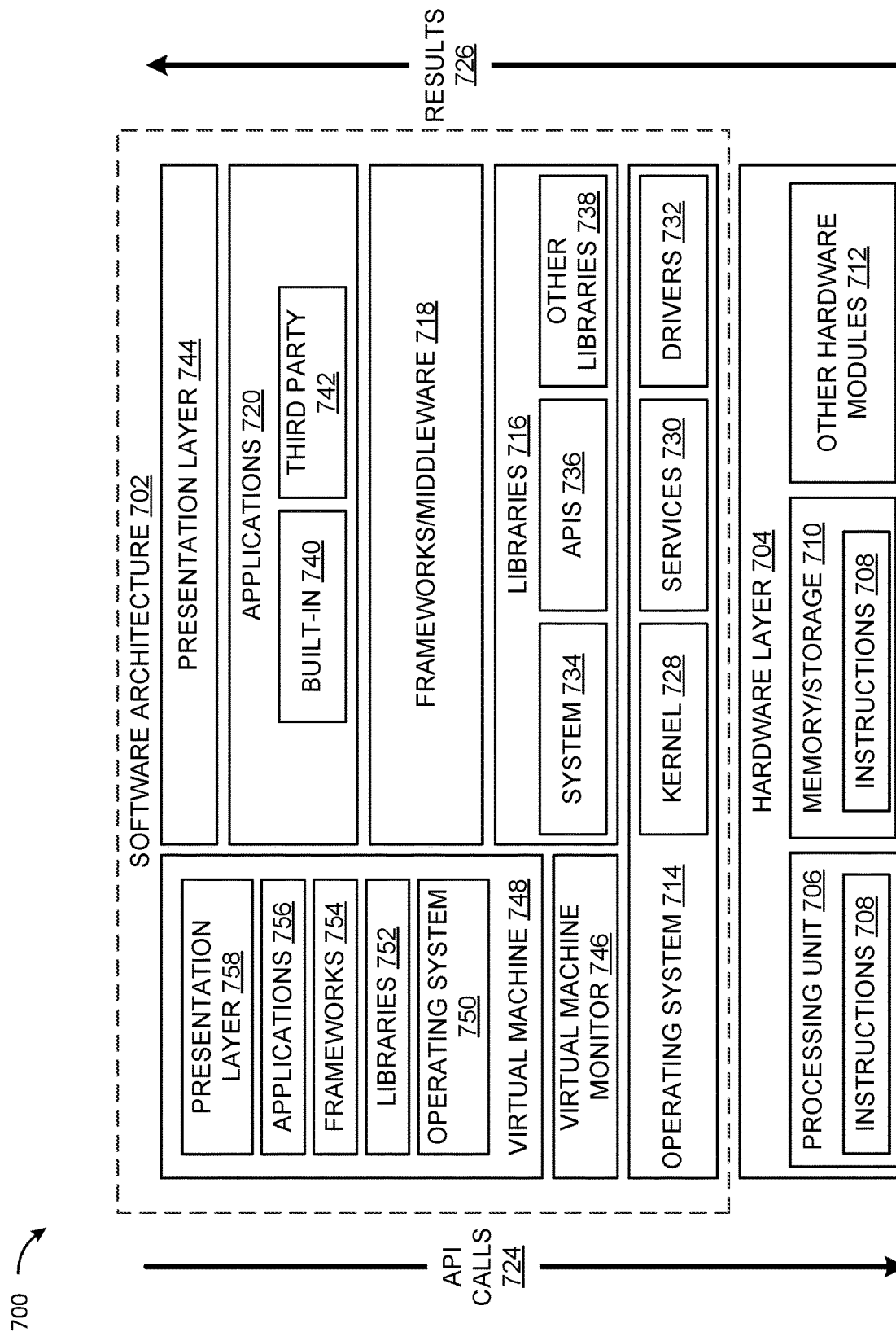
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
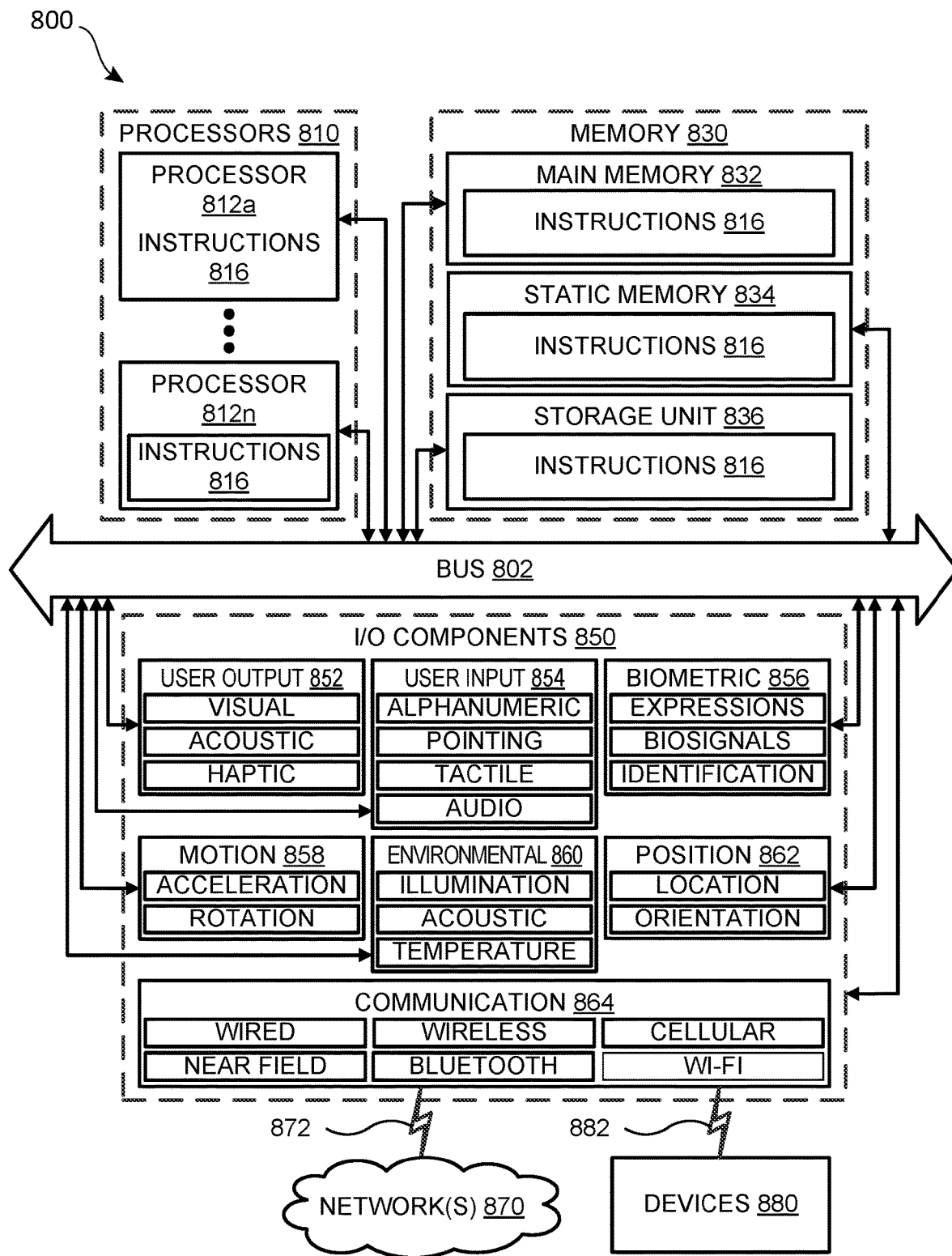
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 862, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed by the processor, cause the processor to perform operations comprising:
      determining a first category of targeted release customers associated with a current stage of a deployment plan for deploying an update to customers of a cloud-based service;
      providing a first indication to each customer of a set of first customers associated with the first category of the targeted release customers that an update is available for users associated with the customer of the set of first customers;
      deploying the update to a first subset of users associated with each customer of the set of first customers;
      receiving a second indication from each customer of the set of first customers that a set of first predeployment requirements (PDRs) associated with each customer of the set of first customers have been completed for the update; and
      deploying the update to a second subset of the users associated with each customer of the set of first customers responsive to receiving the second indication from each customer of the set of first customers, wherein the second subset of the users associated with each customer of the set of first customers comprises a remainder of the users associated with the customer of the set of first customers not included in the first subset of the users associated with each customer of the set of first customers.

2. The data processing system of claim 1, wherein the machine-readable medium further stores executable instructions that, when executed by the processor, cause the processor to perform operations of:
determining a second category of the targeted release customers associated with the current stage of the deployment plan for deploying the update to the customers of the cloud-based service;
providing a third indication to each customer of a set of second customers associated with the second category of the targeted release customers that the update is available for users associated with the customer of the set of first customers;
deploying the update to the first subset of users associated with each customer of the set of second customers;
receiving a fourth indication from each customer of the set of second customers that a set of second PDRs associated with each customer of the set of second customers have been completed for the update, wherein the set of first PDRs are different than the set of second PDRs; and
deploying the update to the second subset of the users associated with each customer of the set of second customers responsive to receiving the fourth indication from each customer of the set of second customers, wherein the second subset of the users associated with each customer of the set of second customers comprises a remainder of the users associated with the customer of the set of second customers not included in the first subset of the users associated with each customer of the set of second customers.

3. The data processing system of claim 1, wherein the first category of the targeted release customers are associated with a first phase of the current stage of the deployment plan and the second category of the targeted release customers are associated with a second phase of the current stage of the deployment plan, and wherein deploying the update to the first subset of users associated with each customer of the set of first customers is performed after deploying the update to the second subset of the users associated with each customer of the set of first customers.

4. The data processing system of claim 1, wherein the deployment plan is a ring-based deployment plan, and wherein the current stage of the deployment plan is a ring or wave of the ring-based deployment plan.

5. The data processing system of claim 1, wherein the machine-readable medium further stores executable instructions that, when executed by the processor, cause the processor to perform operations of:
determining the set of first PDRs associated with each customer of the set of first customers based on the first category of the targeted release customers.

6. The data processing system of claim 1, wherein the machine-readable medium further stores executable instructions that, when executed by the processor, cause the processor to perform operations of:
receiving a set of customer-specific PDRs associated with a first customer of the set of first customers; and
wherein the second indication associated with the first customer of the set of first customers indicates that the set of first PDRs and the set of customer-specific PDRs have been completed.

7. The data processing system of claim 1, wherein the current stage of the deployment plan is associated with a non-targeted release customer, wherein the non-targeted release customer is not associated with a set of PDRs, and wherein the machine-readable medium further stores executable instructions that, when executed by the processor, cause the processor to perform operations of:
automatically deploying the update to an entire userbase of the non-targeted release customer.

8. The data processing system of claim 1, wherein the machine-readable medium further stores executable instructions that, when executed by the processor, cause the processor to perform operations of:
causing a client device of a first user of a first customer of the set of first customers to display an update approval checklist user interface that displays a list of action items to be completed for the set of first PDRs associated with the first customer of the set of first customers before the update may be deployed to the second subset of the users associated with the first customer of the set of first customers.

9. The data processing system of claim 8, wherein the update approval checklist user interface causes the client device of the first user of the first customer of the set of first customers to send a notification to the cloud-based service that a respective action item associated with the set of first PDRs has been completed in response to a checkbox associated with the respective action item being checked.

10. The data processing system of claim 8, wherein the update approval checklist user interface includes an approve update button that is disabled until each action item of the list of action items has been indicated to have been completed, and wherein activating the approve update button causes the client device of the first user of the first customer of the set of first customers to send the second indication to the cloud-based service.

11. A method implemented in a data processing system for managing deployment of updates to a cloud-based service, the method comprising:
determining a first category of targeted release customers associated with a current stage of a deployment plan for deploying an update to customers of a cloud-based service;
providing a first indication to each customer of a set of first customers associated with the first category of the targeted release customers that an update is available for users associated with the customer of the set of first customers;
deploying the update to a first subset of users associated with each customer of the set of first customers;
receiving a second indication from each customer of the set of first customers that a set of first pre-deployment requirements (PDRs) associated with each customer of the set of first customers have been completed for the update; and
deploying the update to a second subset of the users associated with each customer of the set of first customers responsive to receiving the second indication from each customer of the set of first customers, wherein the second subset of the users associated with each customer of the set of first customers comprises a remainder of the users associated with the customer of the set of first customers not included in the first subset of the users associated with each customer of the set of first customers.

12. The method of claim 11, further comprising:
determining a second category of the targeted release customers associated with the current stage of the deployment plan for deploying the update to the customers of the cloud-based service;
providing a third indication to each customer of a set of second customers associated with the second category of the targeted release customers that the update is available for users associated with the customer of the set of first customers;
deploying the update to the first subset of users associated with each customer of the set of second customers;
receiving a fourth indication from each customer of the set of second customers that a set of second PDRs associated with each customer of the set of second customers have been completed for the update, wherein the set of first PDRs are different than the set of second PDRs; and
deploying the update to the second subset of the users associated with each customer of the set of second customers responsive to receiving the fourth indication from each customer of the set of second customers, wherein the second subset of the users associated with each customer of the set of second customers comprises a remainder of the users associated with the customer of the set of second customers not included in the first subset of the users associated with each customer of the set of second customers.

13. The method of claim 11, wherein the first category of the targeted release customers are associated with a first phase of the current stage of the deployment plan and the second category of the targeted release customers are associated with a second phase of the current stage of the deployment plan, and wherein deploying the update to the first subset of users associated with each customer of the set of first customers is performed after deploying the update to the second subset of the users associated with each customer of the set of first customers.

14. The method of claim 11, wherein the deployment plan is a ring-based deployment plan, and wherein the current stage of the deployment plan is a ring or wave of the ring-based deployment plan.

15. The method of claim 11, further comprising:
determining the set of first PDRs associated with each customer of the set of first customers based on the first category of the targeted release customers.

16. A machine-readable medium on which are stored instructions that, when executed by a processor of a programmable device, cause the processor of the programmable device to perform operations of:
determining a first category of targeted release customers associated with a current stage of a deployment plan for deploying an update to customers of a cloud-based service;
providing a first indication to each customer of a set of first customers associated with the first category of the targeted release customers that an update is available for users associated with the customer of the set of first customers;
deploying the update to a first subset of users associated with each customer of the set of first customers;
receiving a second indication from each customer of the set of first customers that a set of first pre-deployment requirements (PDRs) associated with each customer of the set of first customers have been completed for the update; and
deploying the update to a second subset of the users associated with each customer of the set of first customers responsive to receiving the second indication from each customer of the set of first customers, wherein the second subset of the users associated with each customer of the set of first customers comprises a remainder of the users associated with the customer of the set of first customers not included in the first subset of the users associated with each customer of the set of first customers.

17. The machine-readable medium of claim 16, further comprising instructions that, when executed by the processor of the programmable device, cause the processor of the programmable device to perform operations of:
determining a second category of the targeted release customers associated with the current stage of the deployment plan for deploying the update to the customers of the cloud-based service;
providing a third indication to each customer of a set of second customers associated with the second category of the targeted release customers that the update is available for users associated with the customer of the set of first customers;
deploying the update to the first subset of users associated with each customer of the set of second customers;
receiving a fourth indication from each customer of the set of second customers that a set of second PDRs associated with each customer of the set of second customers have been completed for the update, wherein the set of first PDRs are different than the set of second PDRs; and
deploying the update to the second subset of the users associated with each customer of the set of second customers responsive to receiving the fourth indication from each customer of the set of second customers, wherein the second subset of the users associated with each customer of the set of second customers comprises a remainder of the users associated with the customer of the set of second customers not included in the first subset of the users associated with each customer of the set of second customers.

18. The machine-readable medium of claim 17, wherein the first category of the targeted release customers are associated with a first phase of the current stage of the deployment plan and the second category of the targeted release customers are associated with a second phase of the current stage of the deployment plan, and wherein deploying the update to the first subset of users associated with each customer of the set of first customers is performed after deploying the update to the second subset of the users associated with each customer of the set of first customers.

19. The machine-readable medium of claim 16, wherein the deployment plan is a ring-based deployment plan, and wherein the current stage of the deployment plan is a ring or wave of the ring-based deployment plan.

20. The machine-readable medium of claim 16, further comprising instructions that, when executed by the processor of the programmable device, cause the processor of the programmable device to perform operations of:
determining the set of first PDRs associated with each customer of the set of first customers based on the first category of the targeted release customers.

* * * * *